United States Patent
Henson

[11] 3,862,538
[45] Jan. 28, 1975

[54] NUT HARVESTING MACHINE

[76] Inventor: James A. Henson, Box 8, R.R. No. 1, Chetopa, Kans. 67336

[22] Filed: Mar. 14, 1972

[21] Appl. No.: 234,550

[52] U.S. Cl.................................. 56/328 R, 56/16.5
[51] Int. Cl............................................. A01d 51/00
[58] Field of Search................. 56/328 R, 16.5, 364; 198/204

[56] References Cited
UNITED STATES PATENTS

| | | | |
|---|---|---|---|
| 2,854,808 | 10/1958 | Remacher et al. | 56/328 R |
| 2,916,868 | 12/1959 | Ramacher et al. | 56/328 R |
| 2,993,322 | 7/1961 | Wiebe | 56/328 R |
| 3,021,661 | 2/1962 | Couberly | 56/328 R |
| 3,387,442 | 6/1968 | Henson | 56/328 R |
| 3,462,929 | 8/1969 | Ingalls | 56/328 R |
| 3,626,677 | 12/1971 | Sides | 56/328 R |
| 3,728,850 | 4/1973 | Flory | 56/328 X |

Primary Examiner—Louis G. Mancene
Assistant Examiner—J. N. Eskovitz
Attorney, Agent, or Firm—Clarence A. O'Brien & Harvey B. Jacobson

[57] ABSTRACT

A nut harvester in which a transversely extending pickup housing laterally sweeps nuts lying on the ground toward one axial end from which the collected nuts are picked up and deposited into the lower end of an elevator conveyor through a debris removing airflow. The nuts are delivered to an upwardly inclined separator belt from which they roll downwardly into a collection bin. The pickup housing is supported at the forward end of a vehicle propelled by drive of traction wheels through a directionally controlled drive belt transmission.

24 Claims, 15 Drawing Figures

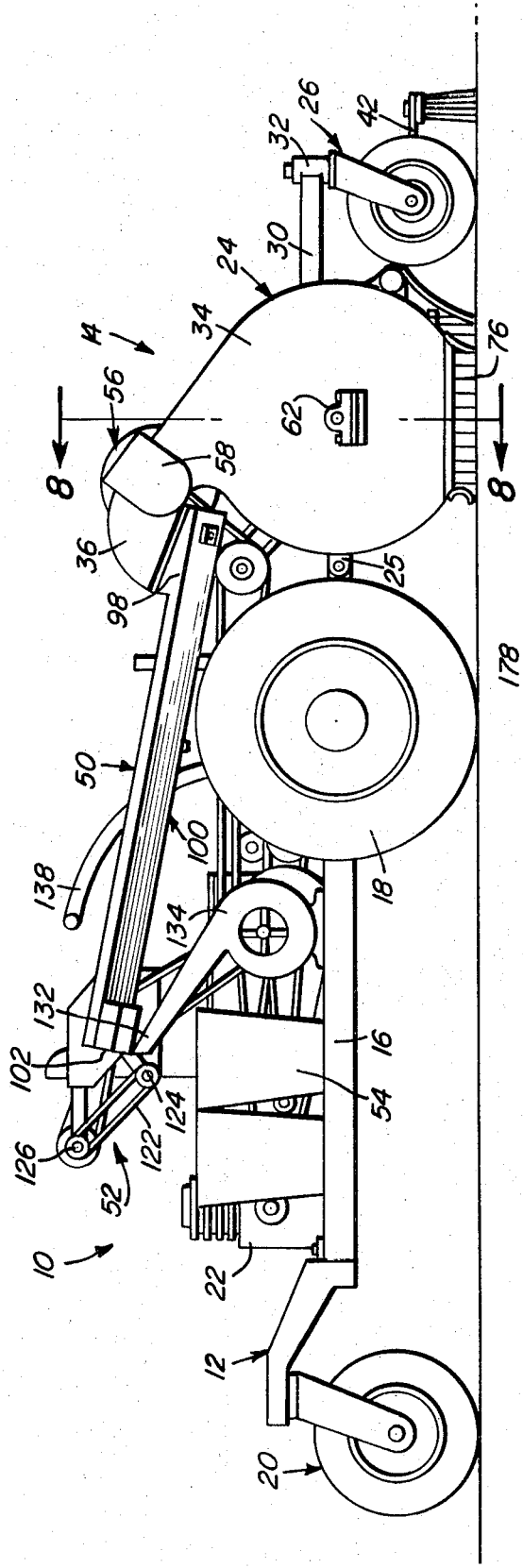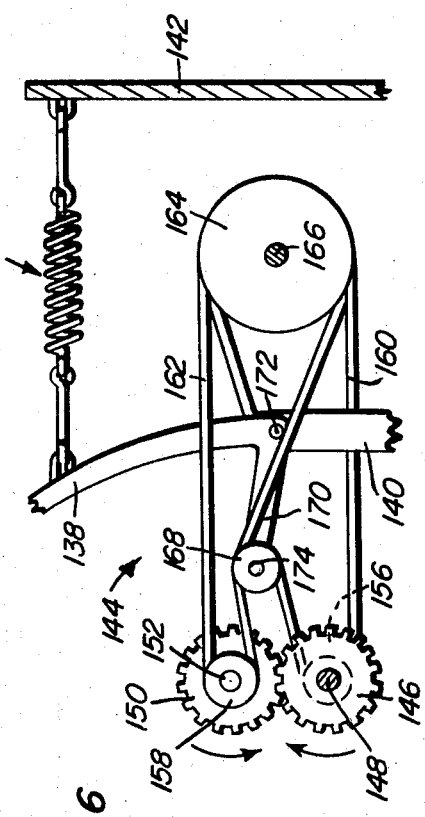

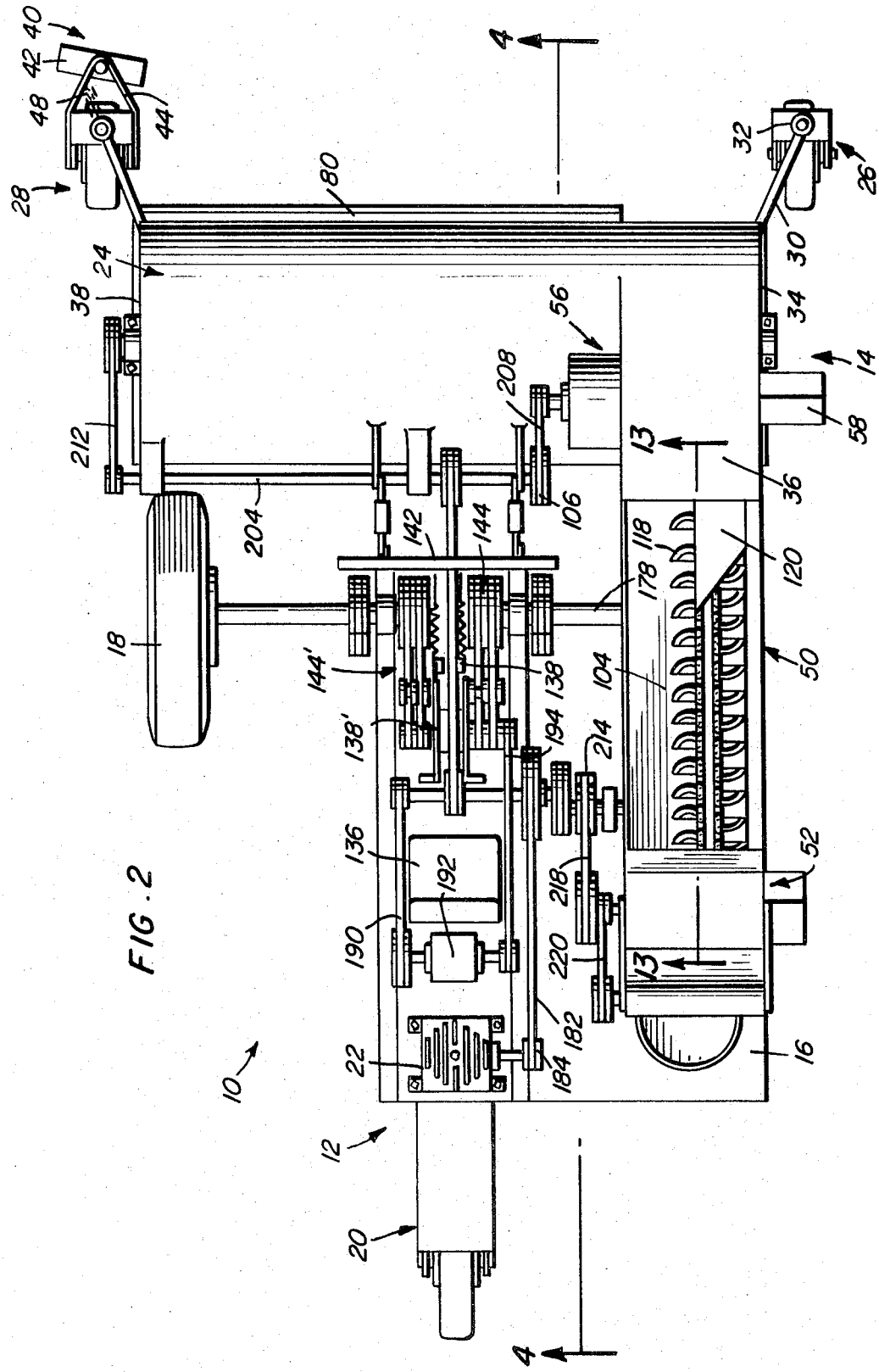

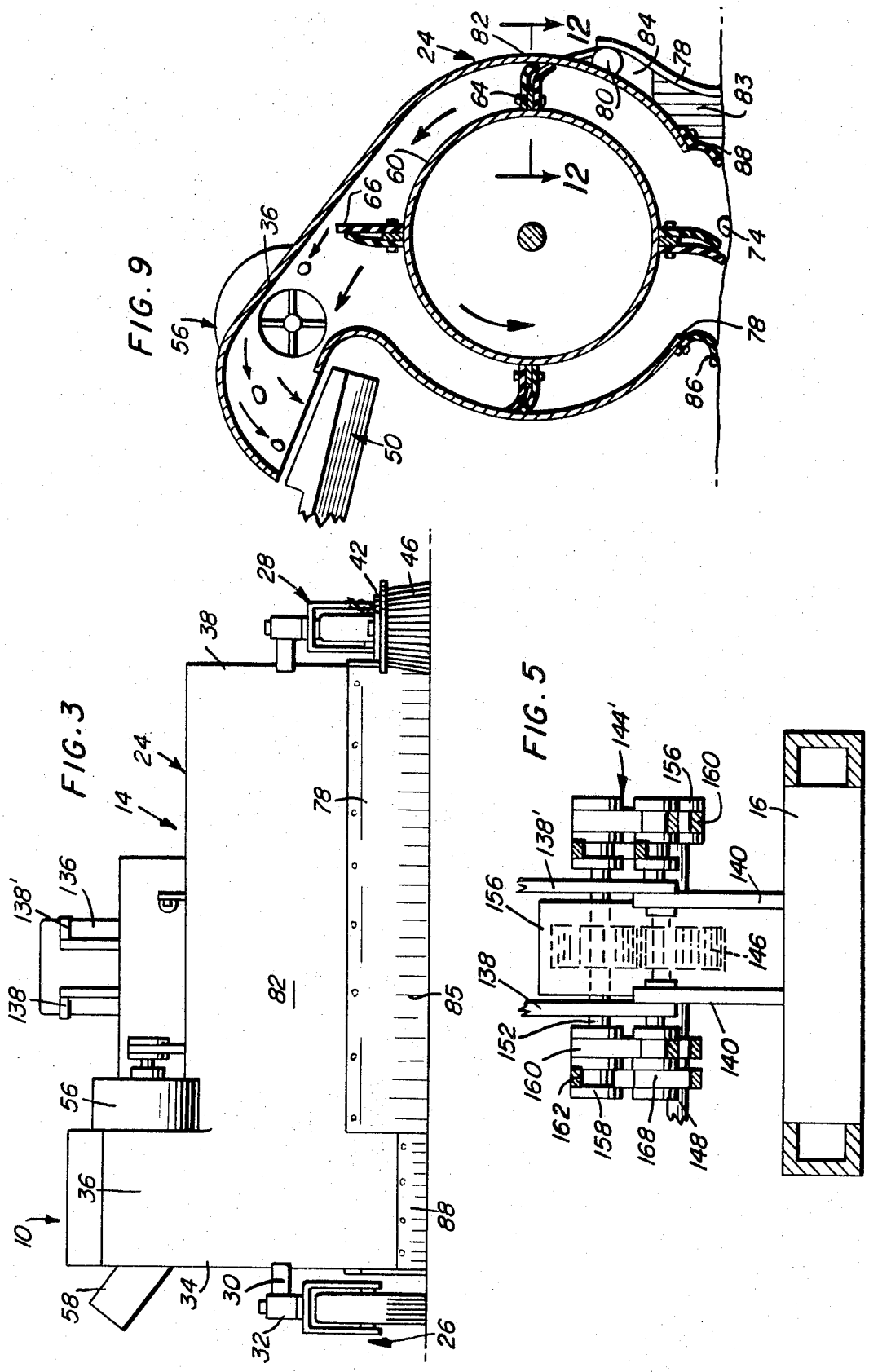

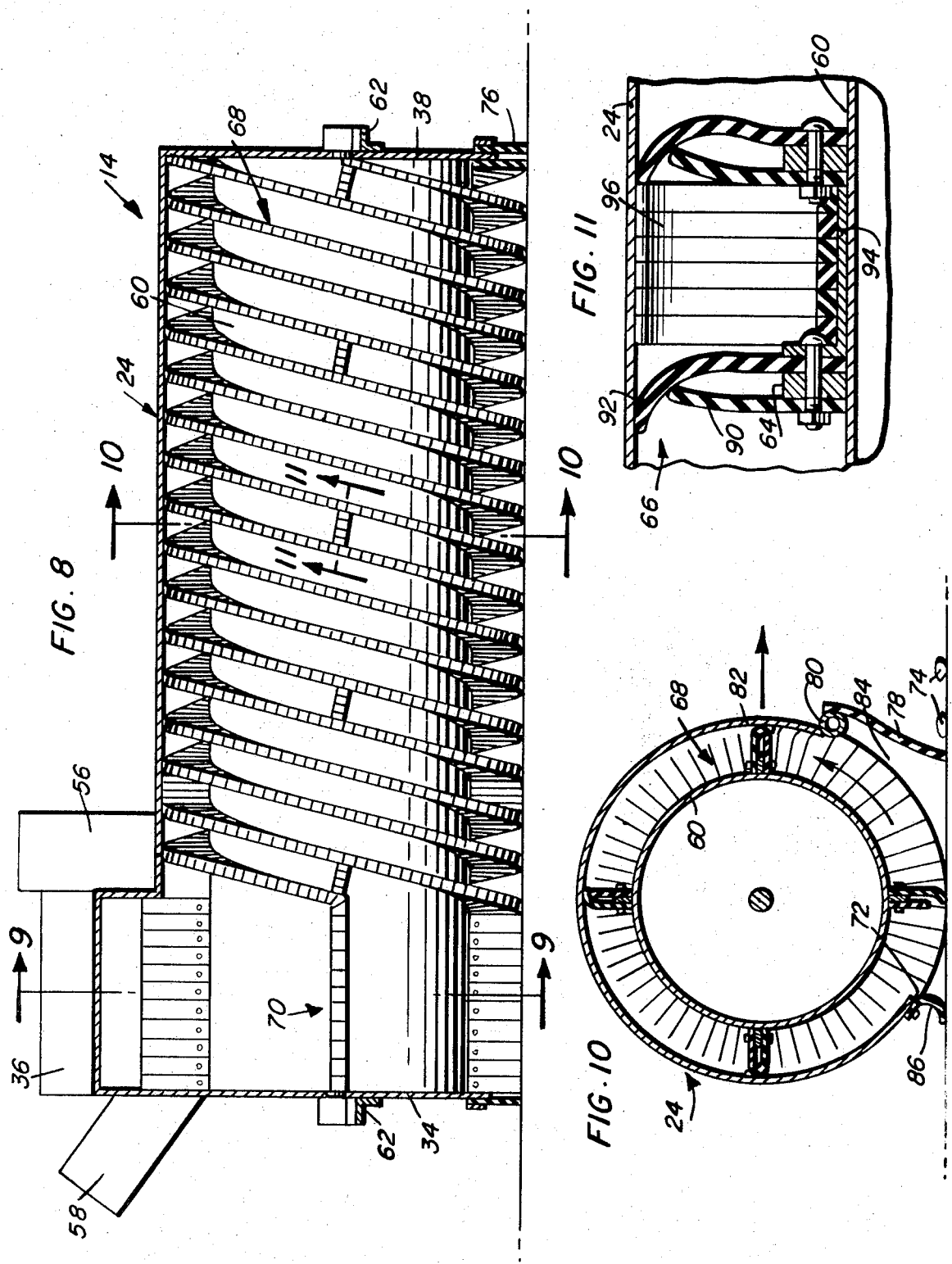

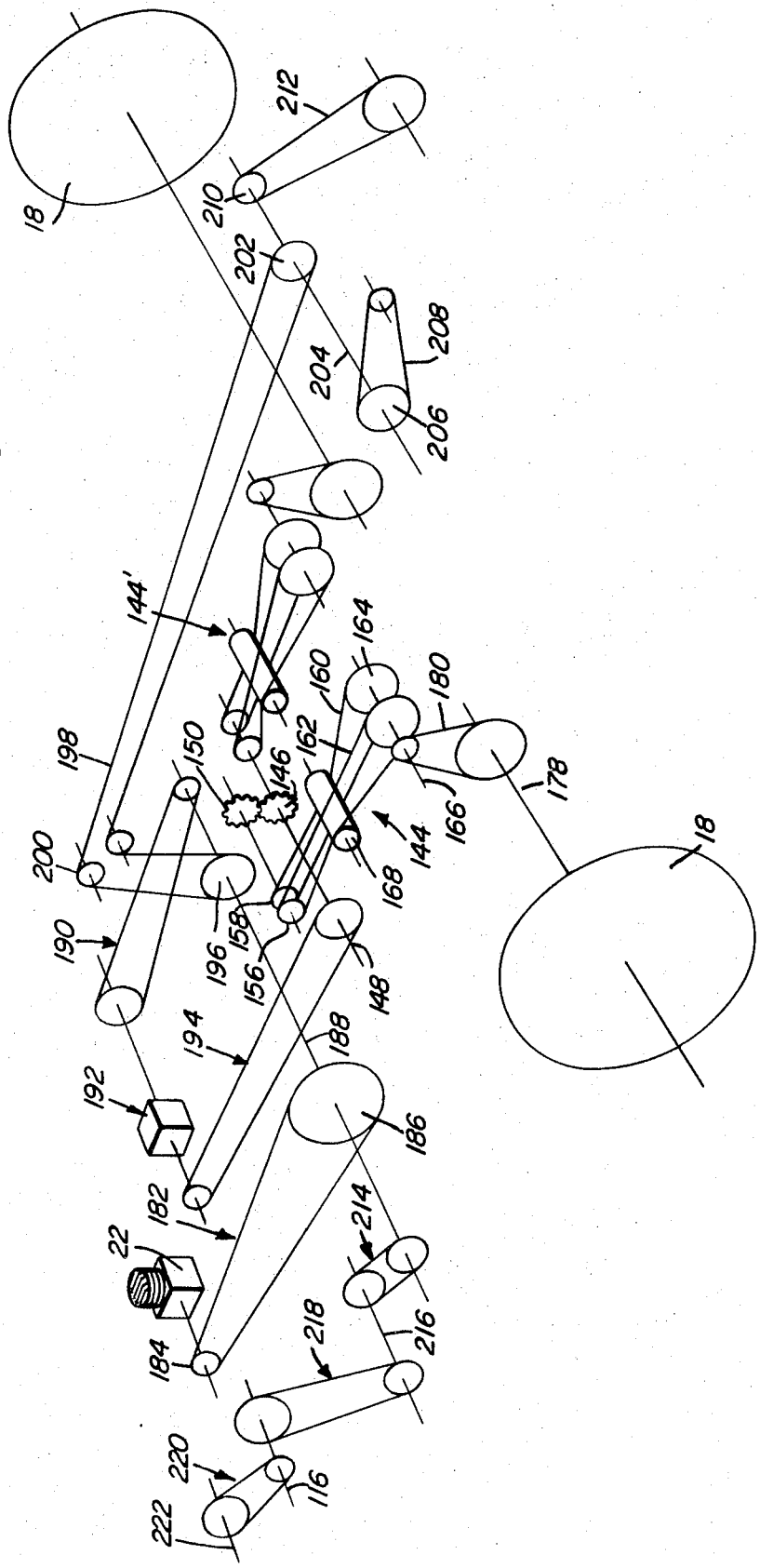

NUT HARVESTING MACHINE

This invention relates generally to agricultural harvesting machines and more particularly to the harvesting of crops such as nuts lying on the ground.

The use of self-propelled machines for harvesting nuts is well known as disclosed for example in my prior U.S. Pat. Nos. 3,128,729 and 3,387,442. In such harvesting machines, a self-propelled vehicle advances a forwardly mounted pickup attachment over the ground on which nuts lie, the pickup attachment being effective to lift the nuts from the ground, deposit them into the lower hopper end of an elevator conveyor from which the nuts are conveyed rearwardly and upwardly for deliverance to a crop collection bin also mounted on the vehicle.

The nut harvesting machine of the present invention embodies several cooperating improvements over the prior art harvesting machines whereby greater maneuverability is achieved as well as a significant improvement in operation of the active components of the harvesting machine. The improved features of the harvesting machine of the present invention furthermore involve elimination of certain complexities in the components associated with prior harvesting machines accompanied by a reduction in maintenance problems and an increase in operational reliability.

The nut harvesting machine of the present invention features a transversely extending pickup attachment at the forward end of the propelling vehicle as in the case of my prior U.S. Pat. No. 3,387,442. The pickup attachment of the present invention however, eliminates the separate laterally conveying auger device by providing flexible blade elements on a rotor that are arranged in a spiral configuration in order to sweep nuts along on the ground laterally toward one axial end of the pickup attachment at which the blade elements are aligned axially of the rotor in order to form a pickup fan portion. Pickup of nuts along the portion of the rotor where the blade elements form the spiral configuration is prevented by a stop arrangement cooperating with a valve flap depending from the front wall of the pickup housing to form a lateral conveying trough along the ground within which the nuts are swept laterally toward the axial discharge end of the pickup housing. The flexible blade elements are formed by leading and trailing flexible fingers of opposite curvature that engage each other to maintain the fingers under tension in the static condition of the rotor on which they are mounted. The fingers are thus operative to engage nuts lying on the ground when projecting from the lower axially elongated opening of the pickup housing during rotation of the rotor in order to sweep the nuts toward the axial discharge end of the housing and to form a discharge fan causing pickup of the nuts and displacement thereof through the outlet portion of the pickup attachment at the discharge end of the pickup housing. The nuts are displaced through a debris separating airflow traversing the outlet before being deposited into the lower hopper end of an elevator conveyor which features curved flexible flights secured to an endless chain positioned on one of two downwardly converging walls of an elevator trough. The nuts are accordingly conveyed upwardly to the delivery end of the trough from which they are deposited onto an upwardly inclined separator belt run moving upwardly. The movement of the belt is such that it does not prevent the heavier nuts from rolling downwardly into a collection bin while debris is carried upwardly for separation therefrom under the impetus of an air jet directed by a blower onto the belt surface.

The elevator conveyor, the separator belt, the blowers as well as the rotor associated with the pickup attachment, are driven by power take-offs from an engine mounted on the harvester vehicle, the engine also being operative through an operator controlled transmission to propel the vehicle and the harvesting machine by means of a pair of traction wheels mounted by the vehicle frame adjacent its forward end rearwardly of the pickup attachment. The vehicle is steered as well as driven in a forward or reverse direction under control of the operator through a pair of belt transmissions thus eliminating complex differential gears and controls. Each belt transmission features a pair of endless drive belts driven in opposite directions and operatively arranged with respect to each other so that they may be alternatively engaged by a selectively positioned belt tightening device that is normally biased to a position in which the forward drive belt is operative to transmit power to the traction wheels. A relatively simple, effective and smoothly operating arrangement is thereby provided for controlling the direction of vehicle propulsion and directionally steering the vehicle. The forwardly mounted pickup attachment is accordingly displaced in one forward direction to act on a crop removal swath that is adjustably limited at one lateral end of the pickup attachment by a floatingly mounted brush device projecting from one of the caster wheels supporting the pickup housing in operatively spaced relation above the ground. The brush device thus displaces nuts out of the path of a traction wheel.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of a nut harvesting machine constructed in accordance with the present invention.

FIG. 2 is a top plan view of the harvesting machine shown in FIG. 1.

FIG. 3 is a front elevational view of the nut harvesting machine.

FIG. 5 is a partial transverse sectional view taken substantially through a plane indicated by section line 5—5 in FIG. 4.

FIG. 6 is an enlarged side sectional view of the reversible belt transmission associated with the harvesting machine in its normal forward drive condition.

FIG. 8 is an enlarged transverse sectional view taken substantially through a plane indicated by section line 8—8 in FIG. 1.

FIG. 9 is a partial side sectional view taken substantially through a plane indicated by section line 9—9 in FIG. 8.

FIG. 10 is a partial side sectional view taken substantially through a plane indicated by section line 10—10 in FIG. 8.

FIG. 11 is a partial enlarged sectional view taken substantially through a plane indicated by section line 11—11 in FIG. 8.

FIG. 15 is a simplified perspective illustration of the drive arrangements associated with the harvesting machine.

Figure 4:
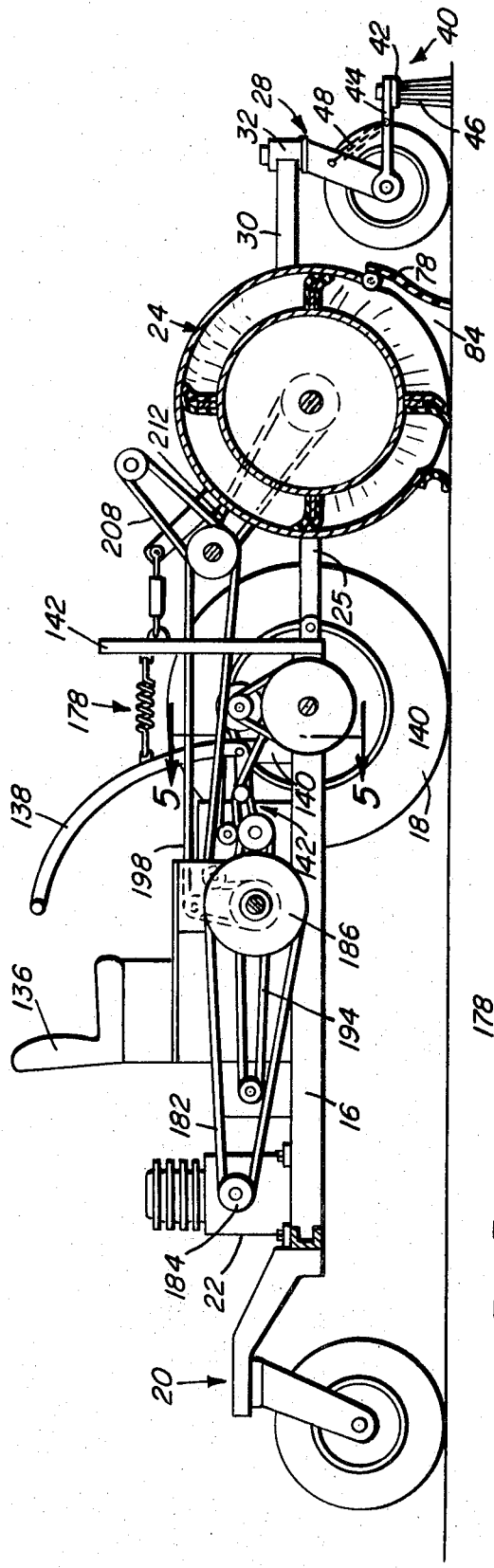
FIG. 4 is a side sectional view taken substantially through a plane indicated by section line 4—4 in FIG. 2.
Figure 12:
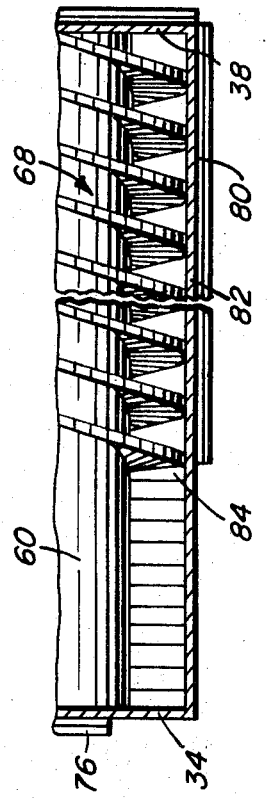
FIG. 12 is an enlarged partial sectional view taken substantially through a plane indicated by section line 12—12 in FIG. 9.

Referring now to the drawings in detail, FIGS. 1, 2 and 3 illustrate the harvesting machine of the present invention, generally denoted by the reference numeral 10. The machine includes a self-propelled vehicle generally referred to by reference numeral 12 and a pickup attachment generally referred to by the reference numeral 14 connected to the vehicle at the forward end. The vehicle includes a platform frame 16 supported above the ground adjacent its forward end by a pair of traction wheels 18 and at its rear end, by a caster type steering wheel assembly 20. The vehicle is propelled by means of power supplied to its traction wheels 18 derived from a prime mover in the form of an internal combustion engine 22 mounted on the platform frame 16 adjacent its rear end. The vehicle is maneuvered or steered by differential drive of the traction wheels as will be explained hereafter, to which the dirigible wheel assembly 20 responds. Thus, during operation of the harvesting machine, the vehicle 12 is propelled in a forward direction pushing ahead of it, the pickup attachment 14 which includes an elongated tubular housing generally referred to by reference numeral 24 which is secured to the forward end of the vehicle by means of a hitch 25, the forward end of the pickup attachment being supported by a pair of caster wheel assemblies 26 and 28. Each caster wheel assembly is positioned forwardly of and laterally of the pickup housing 24 as more clearly seen in FIG. 2 by means of an arm 30, the end of which supports a vertical bearing sleeve 32 establishing a vertical axis about which the caster wheel assembly is rotatable. Thus, the pickup housing 24 which extends transversely or laterally of the longitudinal axis of the vehicle 12, is guided along a path forming a relatively wide swath within which crops, such as nuts, lying on the ground are harvested.

In accordance with the present invention, elevation of the crop off the ground occurs at one axial end 34 of the pickup housing 24 from which an outlet portion 36 extends rearwardly and upwardly. Thus, the harvested swath along the ground is clearly defined at the end 34 of the pickup housing. Objects such as crop or nuts lying on the ground in the path of the pickup housing between the end 38 and the outlet portion 36 of the housing, are swept laterally toward the outlet portion of the housing as will be explained hereafter in detail. At the end 38, at which the caster wheel assembly 28 supports the pickup attachment, a brush assembly generally denoted by reference numeral 40 sweeps the nuts into the path of the pickup housing and out of the path of the traction wheel 18 as well as the wheel assembly 28 to prevent cracking of nuts and mashing of the soil. The brush assembly 40 includes a horizontal blade 42 that is adjustably positioned at a desired angle on a frame 44 pivotally mounted on the axle of the caster wheel assembly 28 as more clearly seen in FIG. 4 in order to floatingly support the brush assembly with the flexible fingers 46 thereof in engagement with the ground. A chain 48 therefore interconnects the floating frame 44 with the caster wheel assembly in order to permit upward retraction of the brush assembly when the harvester is in a non-operating condition.

A conveyor type elevator generally referred to by reference numeral 50 is fixedly mounted on the vehicle in operative relation to the outlet portion 36 of the pickup housing 24 as more clearly seen in FIG. 1 in order to receive the crop therefrom and convey it upwardly toward a separating means generally referred to by reference numeral 52 from which the crop drops into a collection bin 54 positioned therebelow on the vehicle platform frame 16. The separator means 52 is operative to remove debris and other matter from the nuts prior to deposit within the collection bin 54. There is, however, an initial removal of debris and foreign matter from the harvested crop as it passes through the outlet portion 36 of the pickup attachment and toward that end, a blower assembly 56 is connected to the outlet portion 36 as more clearly seen in FIG. 2 for establishing an axial flow of air laterally through the outlet portion 36 in order to discharge the debris from an upwardly inclined exhaust duct 58 on that side of the outlet portion 36 opposite the blower assembly 56. Any nuts carried into the duct 58 by the discharge flow, will roll back into the outlet portion 36 in view of the incline of the duct 58. The top curvature of the outlet portion 36 is such as to gently decelerate movement of the nuts as they are deposited into the elevator 50.

Referring now to FIGS. 8, 9 and 10, in particular, it will be noted that the pickup housing 24 rotatably mounts an axially elongated rotor or drum 60 that is supported for rotation by bearing assemblies 62 on the end walls 34 and 38 of the housing establishing a horizontal, rotational axis substantially parallel to the ground and perpendicular to the direction of movement of the harvesting machine. A blade mounting element or strip 64 is secured externally to the rotor 60 as more clearly seen in FIG. 11 for mounting therealong, a plurality of flexible blade assemblies generally referred to by reference numeral 66. A plurality of blade mounting strips are secured externally to the rotor and form a spiral configuration 68 between the axial end wall 38 and the outlet portion 36 of the housing. Each of the mounting strips forms an axial extension 70 adjacent the end wall 34 as shown in FIG. 8. The blade assemblies 6 along the spiral configuration 68 form a lateral sweeper that engages the ground while projecting through the axially elongated opening 72 of the housing as more clearly seen in FIG. 10 while the blade assemblies on the axial extension 70 form a discharge fan as more clearly seen in FIG. 9 by means of which the nuts 74 are picked up and discharged into the outlet portion 36 through which an axial flow of debris removing air is induced by the blower assembly 56. It will be apparent that because of the spiral configuration 68, the nuts will be laterally displaced along the ground from the end wall 38 toward the end. Flexible sealing flaps 76 extend from the end walls as more clearly seen in FIG.

8 in order to confine the nuts to the action of the blade assemblies projecting through the opening 72. The nuts come into contact with the spirally arranged blade assemblies in response to forward movement of the pickup attachment, moving past a flexible flap valve element 78 as more clearly seen in FIG. 10. The flap valve element 78 depends from a tubular stop member 80 that is attached to the front wall portion 82 of the housing 24. The member 80 extends from the end 38 wall and terminates in axially spaced relation to the end 34 substantially coplanar with a flap seal 83 where the spiral configuration 68 also terminates. The stop member 80 is engaged by the flexible blade assemblies 66 in order to prevent any pickup of nuts that are swept laterally along the ground in a trough space 84 also extending from the end wall 38 to the flap seal 83 as more clearly seen in FIG. 9.

The flap valve element 78 may be made from the center portion of a pneumatic tire having an underformed curvature as shown as well as the desired elasticity for purposes of the present invention. The flap valve strip 78 is furthermore provided with a plurality of longitudinally spaced slits 85 as more clearly seen in FIG. 3 in order to impart to the element the desired degree of flexibility so as to permit passage of the nuts into the trough space 84 in response to forward movement of the harvesting machine. Thus, the nuts entering the space 84 are swept laterally past the flap seal 83 into the discharge end 34 of the pickup housing whereat the nuts are picked up by the blade assemblies along the axial extensions 70 of the blade mounting strips. The bottom opening in the housing at the discharge end portion adjacent the end wall 34 as more clearly seen in FIG. 9, is sealed by the side flaps 76 and 83 and a pair of ground engaging seal elements 86 and 88 in order to preserve the flow inducing pressure produced by the blade assemblies 66 engaging the walls of the housing 24. Nuts also enter the discharge end portion of the pickup housing past the seal 88 in response to forward movement of the harvester.

As more clearly seen in FIG. 11, each of the blade assemblies 66 includes a primary flexible finger 90 and a longer secondary flexible finger 92. The flexible fingers 90 and 92 have opposite curvatures in the undeformed state so that the tip portions thereof engage each other as shown in FIG. 11 to maintain the finger elements under tension in the static condition of the rotor 60 to which the finger elements are secured on opposite sides of the mounting member 64. The mounting member 64 is furthermore backed along the spiral configuration 68 by lugs 94 at spaced locations along the rotor. Flexible fingers 96 are secured to the lugs 94, the fingers 96 being even longer than the flexible fingers 92 associated with the blade assemblies 66. The flexible fingers 96 are operative to engage nuts lying in relatively deep depressions in the ground in order to insure that they are acted on by the lateral sweeping action along the spiral configuration 68. Within the discharge end portion of the pickup housing, the flexible blade assemblies act in the manner described in my prior U.S. Pat. No. 3,387,442 and straighten out under centrifugal force within the outlet portion 36 of the housing as shown to impel the nuts.

Figure 14:
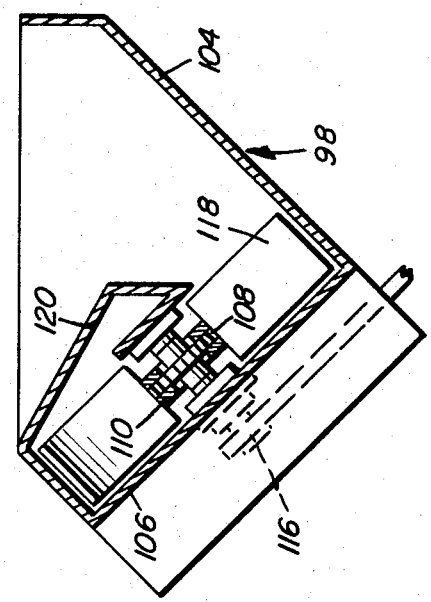
FIG. 14 is a transverse sectional view taken substantially through a plane indicated by section line 14—14 in FIG. 13.

As shown in FIG. 1, the nuts are discharged from the outlet portion 36 of the pickup attachment into the lower hopper end portion 98 of the elevator 50. The hopper portion 98 forms part of an elongated trough generally referred to by reference numeral 100 that extends upwardly at an incline thereby conveying the harvested nuts to the separator means 52 at the discharge end 102 of the trough. As more clearly seen in FIG. 14, the trough 98 is formed by a pair of downwardly converging walls 104 and 106. A pair of sprocket wheels 108 are mounted on the trough wall 106 for rotation about axes perpendicular thereto at the inlet hopper end portion 98 and adjacent the discharge end 102 in order to entrain therebetween an endless sprocket chain driven adjacent the discharge end 102 of the elevator trough. Connected to the endless sprocket chain 110 in longitudinally spaced relationship to each other, are a plurality of curved, flexible flights or nut displacing members 118 that are carred along the trough wall 106. The nuts deposited into the trough, are accordingly displaced by the members 18 along the lowermost run of the sprocket chain 110 since the nuts will collect at the bottom of the trough between the converging walls 106 and 104. The sprocket chain is protected from debris and material deposited into the lower hopper end 98 of the trough by a downwardly inclined cover 120 as shown in both FIGS. 2 and 14.

Figure 13:
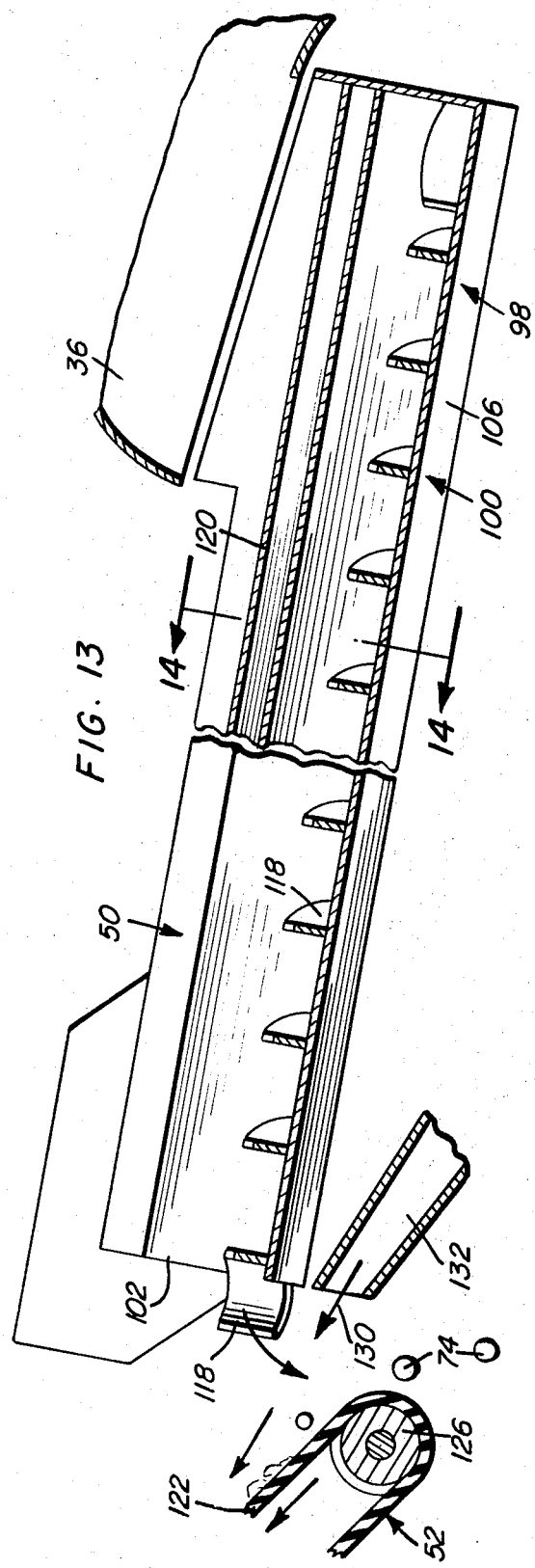
FIG. 13 is a partial side sectional view taken substantially through a plane indicated by section line 13—13 in FIG. 2.

As more clearly seen in FIG. 13, the crop displacing members 118 are conveyed upwardly along the lowermost run of the sprocket chain so as to move the nuts upwardly toward the discharge end 102 from which the nuts are deposited onto an endless separator belt 122 of the separator means 52. The separator belt is entrained about a lowermost idler pulley 124 and an uppermost drive pulley 126 positioned so that the upper run of the belt is at a desired upward incline closely spaced from the discharge end 102 of the elevator trough whereby the nuts 74 are displaced by the members 118 onto the belt. The upward speed of the belt and the incline is such that the nuts 74 will roll downwardly from the belt into the collection bin 54. However, other matter such as debris carried along with the nuts and deposited onto the belt, will be carried upwardly and separated from the nuts by the belt in view of a jet of air 130 directed upwardly and at an angle to the belt from the discharge nozzle end 132 of an air blower 134.

Figure 7:
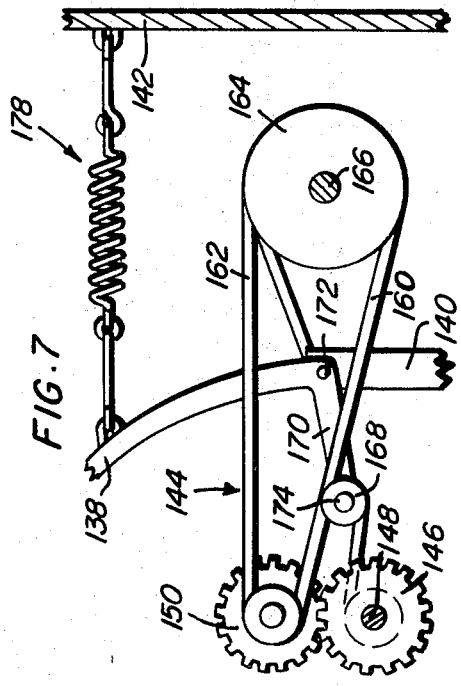
FIG. 7 is a side sectional view similar to FIG. 6 but showing the belt transmission in its actuated reverse drive condition.

As hereinbefore indicated, the various operating components of the harvesting machine are driven by the engine 22 which also is operative to propel the vehicle 12 under control of an operator who may be seated on the seat 136 located on the vehicle platform 16 forwardly of the engine 22. As more clearly seen in FIG. 4, a directional control lever 138 is pivotally mounted on the vehicle frame by means of a post 140 located forwardly of the seat 136 and rearwardly of a dashboard 142 fixed to the forward end of the vehicle. The directional control lever 138 is accordingly within grasp of the operator seated on the seat 136 and is operative through a belt transmission generally referred to by reference numeral 144 to drive one wheel 18 in either a forward or reverse direction. As more clearly seen in FIGS. 5 and 6, a drive gear 146 is rotated in one direction by a drive shaft 148 which is opposite to the rotational direction of the gear 150 enmeshed with the drive gear 146. The drive shaft 148 and a driven shaft 152 located in parallel spaced relation thereabove, to which the driven gear 150 is connected, are rotationally mounted on the vehicle frame by parallel spaced supports 154 as shown in FIG. 5. The belt transmission 144 includes a pulley wheel 156 connected to the drive shaft 148 for rotation in a plane parallel spaced from a pulley wheel 158 connected to the driven shaft 152. A pair of endless drive belts 160 and 162 are respectively entrained about the pulley wheels 156 and 158 and about double sheaved pulley wheel 164 connected by shaft 166 to one of the traction wheels 18. In view of the rotation of the pulley wheels 156 and 158 in opposite directions, the respective drive belts 160 and 162 will alternatively impart rotation to the shaft 166 in opposite directions. Normally, it is drive belt 162 that is operative to transmit drive in a forward direction to the shaft 166. A belt tightening roller 168 is mounted at the forward end of the control arm 170 on the control lever 138, projecting rearwardly from the pivot 172 to which the control lever is connected. The belt tightening roller 168 is engaged with the exterior surface of the drive belt 162 as shown in FIG. 6 and is mounted on a roller shaft 174. The belt tightening roller 168 is also engageable with the exterior surface of the other drive belt 160. In the condition of the belt transmission shown in FIG. 6, the belt tightening device is held in an upper position by a spring device 178 interconnected between the control lever 138 and the dashboard 142. Accordingly, the drive belt 162 is normally tensioned in order to transmit drive in the forward direction while the drive belt 160 is in a slack condition and inoperative to transmit drive. When the control lever is pulled rearwardly by the operator against the bias of the spring device 178 as shown in FIG. 7, the belt tightening roller is in its lower position, tightening the drive belt 160 in order to transmit drive in a reverse direction to one of the traction wheels. Because the belt tightening roller assembly is engaged with the exterior surfaces of the two drive belts, and because of the relative positions of these drive belts, a relatively small force is required to actuate or displace the directional control lever 138 from its forward drive position in order to effect reverse drive for one of the traction wheels 18. Drive of the other traction wheel is similarly controlled by a second control lever 138' through a second belt transmission 144'. Thus, by alternately actuating the control levers 138 and 138', the operator may steer the vehicle and by simultaneously actuating the control levers reverse drive of the vehicle may be effected.

FIG. 13 diagrammatically shows the drive train arrangement associated with the harvesting machine wherein each of the shafts 166 is drivingly connected to a wheel shaft 178 through a belt drive 180. Accordingly, the wheels 18 may be driven in a forward or reverse direction under control of the belt transmission 144. Also, by controlling the position of the control lever between the forward and drive positions, relative slippage of the drive belts 160 and 162 may be obtained in order to vary the speed of the vehicle. The input to the belt transmission is derived from the engine 24 as aforementioned through a drive train as schematically shown in FIG. 13 which includes a belt drive 182 extending from the engine pulley 184 to an intermediate drive pulley 186 which is connected by a shaft 188 to the drive pulley associated with another belt drive 190 connected to the input side of a gear box 192. The output of the gear box is connected by a a belt drive 194 to the drive shaft 148 of the belt transmission 144.

With continued reference to FIG. 13, a power take-off pulley 196 is connected to the intermediate drive shaft 188 and an endless drive belt 198 is entrained thereabout. The drive belt 198 extends upwardly from the pulley 196 and is entrained about a pair of idler pulleys 200 so that the drive belt 198 may extend forwardly therefrom to a driven pulley 202. The driven pulley 202 is connected to a power shaft 204 having a pulley 206 connected at one end for drive of the blower unit 56 through the drive belt 208 while the other end of the shaft 204 has a pulley 210 connected thereto for drive of the pickup rotor 60 by means of the drive belt 212.

The intermediate drive shaft 188 as shown in FIG. 13 is drivingly connected through a belt drive 214 and power shaft 216 to the blower 134 associated with the separator 52. The blower power shaft 216 is furthermore drivingly connected through the belt drive 218 to the upper end portion of the elevator conveyor 50 by means of a power shaft 116. The power shaft 116 is in turn drivingly connected through the belt drive 220 to the drive shaft 222 for the separator belt 122 aforementioned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A pick-up device for crops lying on the ground including a housing having an axially elongated opening spaced above the ground, a rotor mounted for rotation within the housing, mounting means forming a spiral configuration secured to the rotor and flexible blade means projecting from the mounting means through the opening in the housing for engagement with the ground to displace the crop toward one axial end portion of the housing, said blade means including a plurality of primary blade elements spaced by the mounting means from a plurality of confronting secondary blade elements, said primary and secondary blade elements having opposite curvatures respectively, in the undeformed state and tip portions engaging each other to maintain the blade elements under tension in a static condition of the rotor.

2. The combination of claim 1 wherein said mounting means includes an axial extension of the spiral configuration at said one axial end portion of the housing, the blade means secured to said axial extension forming a discharge fan portion, and outlet means connected to the housing at said one axial end portion through which the crop is discharged by the blade means.

3. The combination of claim 2 including stop means mounted on the housing in engagement with the blade means along the spiral configuration for preventing pickup of the crop except at said one axial end portion of the housing, a valve flap secured to the stop means for engagement with the ground in spaced relation to the blade means and seal means mounted on the housing at said one axial end portion for collecting the crop below the discharge fan portion of the blade means.

4. The combination of claim 1 including a plurality of spiral bracing lugs secured to the rotor along the spiral configuration of the mounting means and flexible fingers secured to said lugs projecting radially of the rotor beyond the blade means.

5. A pick-up device for crops lying on the ground including a housing having an axially elongated opening spaced above the ground, a rotor mounted for rotation within the housing, mounting means forming a spiral configuration secured to the rotor and flexible blade means projecting from the mounting means through the opening in the housing for engagement with the ground to displace the crop toward one axial end portion of the housing, said mounting means including an axial extension of the spiral configuration at said one axial end portion of the housing, the blade means secured to said axial extension forming a discharge fan portion, and outlet means connected to the housing at said one axial end portion through which the crop is discharged by the blade means.

6. The combination of claim 5 including stop means mounted on the housing in engagement with the blade means along the spiral configuration for preventing pickup of the crop except at said one axial end portion of the housing, a valve flap secured to the stop means for engagement with the ground in spaced relation to the blade means and seal means mounted on the housing at said one axial end portion for collecting the crop below the discharge fan portion of the blade means.

7. A pick-up device for crops lying on the ground including a housing having an axially elongated opening spaced above the ground, a rotor mounted for rotation within the housing, mounting means forming a spiral configuration secured to the rotor and flexible blade means projecting from the mounting means through the opening in the housing for engagement with the ground to displace the crop toward one axial end portion of the housing, stop means mounted on the housing in engagement with the blade means along the spiral configuration for preventing pickup of the crop except at said one axial end portion of the housing, a valve flap secured to the stop means for engagement with the ground in spaced relation to the blade means and seal means mounted on the housing at said one axial end portion for collecting the crop below the discharge fan portion of the blade means.

8. The combination of claim 7 wherein said valve flap comprises an elongated flexibly elastic strip having an undeformed, transverse curvature and a plurality of longitudinally spaced slits formed therein.

9. A harvester for crops lying on the ground including a housing, pickup means projecting from the housing at one axial end for lifting the crop off the ground, sweeping means projecting from the housing for laterally displacing the crop along the ground toward said pickup means, vehicle means for propelling the housing in one direction, wheel means secured to the housing forwardly thereof in said one direction for support of the housing in operatively spaced relation to the ground and conveyor means for receiving the crop from the pickup means.

10. The combination of claim 9 wherein said pickup means includes a rotor mounted for rotation within the housing, a plurality of primary and secondary blade elements mounted on the rotor having opposite curvatures respectively, in the undeformed state and tip portions engaging each other to maintain the blade elements under tension in a static condition of the rotor.

11. The combination of claim 10 wherein the conveyor means includes an elongated trough having downwardly converging bottom walls extending between receiving and delivery ends, a flexible drive element mounted on one of the bottom walls spaced from the other of the bottom walls of the trough, a plurality of crop displacing members secured to the drive element for movement along said one of the bottom walls and protective means fixed to said trough in overlying relation to the drive element adjacent to the receiving end of the trough.

12. The combination of claim 11 including upwardly moving, inclined belt means mounted in operatively spaced relation to the delivery end of the trough for receiving material discharged therefrom, a receiving bin positioned below the belt means into which the material drops from the belt means, and blower means for directing a jet of air onto the belt means for maintaining upward movement of debris on the belt means separating the same from the material.

13. The combination of claim 12 including angularly adjustable brush means connected to the wheel means.

14. The combination of claim 9 wherein the vehicle means includes traction wheels, an engine, and reversible drive means interconnecting the engine with the traction wheels.

15. The combination of claim 14 wherein said reversible drive means includes a pair of drive members drivingly connected to the engine for rotation in opposite directions, a pair of driven members, a pair of endless drive belts respectively entrained about one of the drive and driven members for rotation of the driven members in opposite direction, means interconnecting the traction wheels with said driven members, belt tightening means for alternatively rendering the drive belts operative to transmit drive between the drive and driven members, control means movably mounting the belt tightening means between the drive belts in external engagement therewith, and means for biasing the control means to one position rendering only one of the drive belts operative to transmit drive.

16. The combination of claim 14 including angularly adjustable brush means connected to the wheel means for displacing the crop out of the path of the traction wheel means.

17. The combination of claim 9 wherein the conveyor means includes an elongated trough having downwardly converging bottom walls extending between receiving and delivery ends, a flexible drive element mounted on one of the bottom walls spaced from the other of the bottom walls of the trough, a plurality of crop displacing members secured to the drive element for movement along said one of the bottom walls and protective means fixed to said trough in overlying relation to the drive element adjacent to the receiving end of the trough.

18. The combination of claim 17 including upwardly moving, inclined belt means mounted in operatively spaced relation to the delivery end of the trough for receiving material discharged therefrom, a receiving bin positioned below the belt means into which the material drops from the belt means, and blower means for directing a jet of air onto the belt means for maintaining upward movement of debris on the belt separating the same from the material.

19. The combination of claim 18 wherein the vehicle means includes traction wheels, an engine, and reversible drive means interconnecting the engine with the traction wheels.

20. The combination of claim 19 wherein said reversible drive means includes a pair of drive members drivingly connected to the engine for rotation in opposite directions, a pair of driven members, a pair of endless drive belt respectively entrained about one of the drive and driven members for rotation of the driven members in opposite directions, means interconnecting the traction wheels with said driven members, belt tightening means for alternatively rendering the drive belts operative to transit drive between the drive and driven members, control means movably mounting the belt tightening means between the drive belts in external engagement therewith, and means for biasing the control means to one position rendering only one of the drive belts operative to transmit drive.

21. The combination of claim 9 including outlet means connected to the housing for receiving the crop tangentially from the pickup means and conducting the same along a curved path into the conveyor means to decelerate the crop entering the conveyor means.

22. The combination of claim 21 including blower means for inducing a flow of air through the outlet means transversely of said path to remove debris, and an upwardly inclined exhaust duct connected to the outlet means through which said flow of air is discharged.

23. The combination of claim 9 including blower means for inducing a flow of air through the outlet means transversely of said path to remove debris, and an upwardly inclined exhaust duct connected to the outlet means through which said flow of air is discharged.

24. In combination with a harvester having pick-up means, a crop conveyor having a delivery end and a receiving end into which objects are deposited by the pick-up means, said crop conveyor comprising an elongated trough having downwardly converging bottom walls extending between the receiving and delivery ends, a flexible drive element mounted on one of the bottom walls spaced from the other of the bottom walls of the trough, a plurality of crop displacing members secured to the drive element for movement along said one of the bottom walls and protective means fixed to said trough in overlying relation to the drive element adjacent to the receiving end of the trough.

* * * * *